(12) United States Patent
Bendel et al.

(10) Patent No.: US 9,106,114 B2
(45) Date of Patent: Aug. 11, 2015

(54) DRIVE COMPONENT FOR A MOTOR VEHICLE UNIT

(75) Inventors: Thorsten Bendel, Oberhausen (DE); Claus Töpfer, Sindelfingen (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 427 days.

(21) Appl. No.: 13/055,666

(22) PCT Filed: Aug. 3, 2009

(86) PCT No.: PCT/IB2009/007036
§ 371 (c)(1),
(2), (4) Date: Apr. 6, 2011

(87) PCT Pub. No.: WO2010/010471
PCT Pub. Date: Jan. 28, 2010

(65) Prior Publication Data
US 2011/0173892 A1    Jul. 21, 2011

(30) Foreign Application Priority Data
Jul. 25, 2008  (DE) ............... 20 2008 010 051 U

(51) Int. Cl.
*F16C 1/22*    (2006.01)
*H02K 5/24*    (2006.01)
(Continued)

(52) U.S. Cl.
CPC  *H02K 5/24* (2013.01); *E05B 81/20* (2013.01); *E05F 15/603* (2015.01);
(Continued)

(58) Field of Classification Search
CPC ......... F16F 15/08; F16F 1/3732; F16C 1/108; E05B 81/06; E05B 81/05; E05B 79/20; E05B 77/34; E05B 77/04; H02K 5/24; H02K 5/10; H02K 7/116; H02K 7/08; E05F 15/632; E05F 15/611; E05F 15/665; E05F 15/603; E05F 15/697
USPC ....... 292/201, 216, DIG. 23; 74/502.4, 502.6; 403/50–51, 223, 225–228, 291; 248/580, 583, 605, 609, 634, 638, 635; 384/215, 200; 267/140.4, 141.1–141.7, 267/293; 296/35.1
See application file for complete search history.

(56) References Cited

U.S. PATENT DOCUMENTS 5,765,447 A * 6/1998 Goffena .................. 74/502.6
6,197,403 B1 * 3/2001 Brown et al. ............. 428/137
(Continued)

FOREIGN PATENT DOCUMENTS

DE    199 38 378 A1    5/2000
DE    100 48 051 A1    4/2002
(Continued)

OTHER PUBLICATIONS

Machine Translation of DE 102004017300.*

*Primary Examiner* — Marcus Charles
*Assistant Examiner* — Yamilka Pinero Medina
(74) *Attorney, Agent, or Firm* — Konomi Takeshita

(57) ABSTRACT

A drive component for a motor vehicle unit, in particular a motor vehicle door unit, especially a closing/opening device (1) in or on a motor vehicle door lock (2), comprising at least one motor (3) and at least one rubber-elastic bearing (4) for fixing the motor (3) on a base (5), wherein the bearing (4) has different spring rates ($D_1$, $D_2$) in the axial direction (A) and/or the radial direction (R).

15 Claims, 2 Drawing Sheets

(51) Int. Cl.

| | |
|---|---|
| *E05B 81/20* | (2014.01) |
| *E05F 15/603* | (2015.01) |
| *E05F 15/611* | (2015.01) |
| *E05F 15/632* | (2015.01) |
| *E05F 15/665* | (2015.01) |
| *E05F 15/697* | (2015.01) |
| *E05B 77/04* | (2014.01) |
| *E05B 15/04* | (2006.01) |
| *H02K 5/10* | (2006.01) |
| *H02K 7/08* | (2006.01) |
| *H02K 7/116* | (2006.01) |
| *E05B 77/34* | (2014.01) |

(52) U.S. Cl.
CPC ............ *E05F 15/611* (2015.01); *E05F 15/632* (2015.01); *E05F 15/665* (2015.01); *E05F 15/697* (2015.01); *E05B 77/04* (2013.01); *E05B 77/34* (2013.01); *E05B 2015/0472* (2013.01); *E05Y 2900/55* (2013.01); *H02K 5/10* (2013.01); *H02K 7/08* (2013.01); *H02K 7/116* (2013.01)

(56) References Cited

U.S. PATENT DOCUMENTS

| | | | | |
|---|---|---|---|---|
| 6,435,489 | B1* | 8/2002 | Rice et al. | 267/140.5 |
| 7,306,269 | B2* | 12/2007 | Cetnar et al. | 292/341.12 |
| 7,316,389 | B2* | 1/2008 | Rawson | 267/141.7 |
| 7,637,542 | B2* | 12/2009 | Suzumura et al. | 292/216 |
| 2003/0151250 | A1* | 8/2003 | Miura et al. | 285/62 |
| 2009/0077896 | A1* | 3/2009 | Warren et al. | 49/349 |

FOREIGN PATENT DOCUMENTS

| | | |
|---|---|---|
| DE | 101 31 590 A1 | 1/2003 |
| DE | 10 2004 017 300 A1 | 11/2005 |
| DE | 20 2005 004 545 U1 | 7/2006 |
| EP | 1 886 852 A1 | 2/2008 |
| JP | S59-188336 Y | 12/1984 |
| JP | H05-196244 A1 | 8/1993 |
| JP | 07-032819 U | 6/1995 |
| JP | H10-26180 A1 | 1/1998 |
| JP | 2004-168205 A1 | 6/2004 |
| WO | 01/54252 A1 | 7/2001 |
| WO | 02/075759 A2 | 9/2002 |
| WO | 2005/116375 A1 | 8/2005 |

* cited by examiner

DRIVE COMPONENT FOR A MOTOR VEHICLE UNIT

CROSS REFERENCE TO RELATED APPLICATIONS

This application claims priority under 35 U.S.C. 119 and 35 U.S.C. 365 based upon German Patent Application No. 20 2008 010 051.8, filed on Jul. 25, 2008. The entire disclosure of the aforesaid application is incorporated herein by reference.

FIELD OF THE INVENTION

The invention relates to a drive component for a motor vehicle unit, especially a motor vehicle door unit, preferably for a closing/opening device in or on a motor vehicle door lock, comprising at least one motor and at least one rubber-elastic bearing for fixing the motor to a base.

BACKGROUND OF THE INVENTION

The motor is generally an electric motor. Motor vehicle units that are operated by the motor or electric motor can include, for instance, mirrors, seats, steering columns, windows, etc. It is particularly preferable to activate and operate motor vehicle door units with the aid of a motor or an electric motor. Such units include for instance, the already mentioned external mirrors or also other elements inside or on the motor vehicle door that can be adjusted with the aid of the motor. Particularly preferably the motor or electric motor is used for activating and/or actuating a closing/opening device in a motor vehicle door lock.

In this context, the drive component in question is usually an external drive component, operating therefore normally the separately located closing/opening device via a Bowden cable or another connection means. Such a closing/opening device generally serves to move the motor vehicle door, for instance, from an intermediate closed position to a fully closed position by means of the motor. For this purpose, the operator only has to move the respective motor vehicle door into the intermediate closed position or intermediate locked position. The door then moves automatically into the fully closed position or fully locked position with the aid of the motor of the external drive unit.

In addition, also opening units for the motor vehicle door lock that are activated by a motor are known. These ensure that the motor vehicle door is opened by a motor. Such closing/opening devices are predominantly used in expensive cars and primarily serve to increase the level of comfort. Safety aspects are also increasingly important. As in motor vehicles with, for instance, assisted closing, it is always guaranteed that the respective motor vehicle door is in its fully closed position or fully locked position in which the passengers of the motor vehicle enjoy maximum protection. An example of such a closing/opening device is disclosed in DE 199 38 378 C2. The object of DE 100 48 051 A1 is an assisted closing device.

Assisted closing devices are also known from practical application and are generally installed inside the motor vehicle door. Increasingly this presents the problem of insulating the interior against noises produced by the motor or electric motor or guaranteeing an extremely low noise operation of the closing/opening device. Practical applications already make use of decoupled threaded elements or foam underlay for installing the motor.

The type-defining DE 101 31 590 A1 describes a similar embodiment in which the motor is simply installed on fixing hooks, whilst at the same time being decoupled by rubber insulation elements. In this arrangement, the electric motor is positioned in a mainly pot-like housing containing a receiving opening. The housing contains at least a spring-loaded fixing element containing a thermoplastic elastomer. The known motor is, however, used for driving a fan and not for actuating a closing/opening device.

There is, however, the danger that as a result of actual contact between the motor and the car body via respective fastening elements, motor noises can enter the motor vehicle door, a motor vehicle door module and thus the car interior as structure-borne noises, which can be regarded as annoying. The invention aims to remedy this situation.

SUMMARY OF THE INVENTION

The invention is based on the technical problem of further developing such a drive component for a motor vehicle unit in such a way that a correct and easily installed bearing is provided for the motor and that, at the same time, the produced noise is reduced considerably.

In order to solve this technical problem, a generic drive component for a motor vehicle unit of the invention is characterized by the bearing having different spring rates in axial direction and/or the radial direction and possibly depending on the degree of deformation.

Generally, the axial and/or radial section of the bearing has at least partially a concertina-like design. In this arrangement, a first spring rate for elastic structural deformation is provided by a concertina section of the bearing, whilst a second larger spring rate is provided by a rubber-elastic, intramolecular deformation of the bearing material.

This means that the bearing of the invention, with the aid of which the motor is connected to the base, contains a first (relatively small) spring rate and a second (comparably larger) spring rate. Then first spring rate is being provided by the concertina-like design of the bearing or by a concertina section provided at this point. Forces acting upon the bearing cause the concertina section to elastically and structurally deform, i.e. to change its outer shape—like a spring. In the simplest arrangement, the concertina section is either compressed or extended when exposed to forces. Consequently, the material used for making the bearing, the bearing material, initially shows no or only little intramolecular deformation. Instead, the concertina section is extended or compressed like a coil spring.

The arrangement also provides a corresponding relatively low spring rate, particularly effective for acoustically attenuating high frequencies. Such high frequencies are usually created by rotary movements of the motor or electric motor. These motors are high-speed electric motors, whose rotary movement is generally produced by multiple gear reductions in order to be able to provide the required forces for acting upon the respective unit, preferably the closing/opening device, on the output side. The noises created by such rapid rotary movements and, in particular, the vibrations are according to the invention advantageously predominantly acoustically attenuated by the concertina section or by the first (low) spring rate of the bearing. This means that there is practically no transmission of structure-borne noise from the motor to the base, e.g. when driving over potholes, during fast acceleration or slamming of the doors.

The second larger spring rate of the bearing is predominantly used when the motor is, for instance, to be slowed down in case of an accident and the bearing moves to "block".

This means that the concertina section is completely compressed and that any (additional) forces acting upon the motor are absorbed by the known rubber-elastic intramolecular deformation of the bearing material providing a spring rate greater than that of the concertina section. This explains the different spring rates available depending on the degree of deformation.

The rubber-elastic intramolecular deformation of the bearing material is due to the known spring characteristic of rubber-elastic material with its internal wide-meshed cross linking of molecule groups. Elastomers are indeed made up of elastically deformable plastic, predominantly coiled polymer chains. The polymer chains react to the tensile loading by extending or uncoiling, with the chains returning to their coiled condition once the tensile loading abates. The reverse applies during compressive loading.

As materials for the rubber-elastic bearing the invention recommends the use of elastomers commonly used in the industry, such as ethylene-propylene-diene rubbers (EPDM), silicone rubber (VMQ), styrene-butadiene rubber (SBR), acrylic rubber (ACM), natural rubber (NR) or also acrylonitrile butadiene rubber (NBR). Also, so-called elastomer blends or polyblends, i.e. mixtures of final polymers consisting of several molecule species can be used. With different mixing ratios and additives, tailor-made materials can be produced, such as for instance polyolefin elastomers consisting of polypropylene (PP), polypropylene and talcum or also of natural rubber (NR). Depending on the quantity ratios used, tailor-made second spring rates can be achieved.

The bearing of the invention will in any case provide two functions. First of all it will prevent vibrations or generally structure-borne noise of the motor from being transferred onto the base. This is mainly ensured by the concertina section and the first spring rates. The bearing also functions as an end stop in the event that the motor has to be definitively slowed down due to acceleration forces, such as during slamming off the door or in case of an accident. This is achieved by the second spring rate and the associated intramolecular deformation of the bearing material.

It has proven to be advantageous if the motor is fixed to the base on several, preferably three or four bearings. Such, for instance, three bearings of the motor ensure that the thus created three-point bearing is statically defined. The three bearings are also arranged on a common bearing plane or span such a plane.

It has also proven to be advantageous if at least one bearing or the several bearings in vertical projection or when viewing the base from the top are arranged with its/their connecting head(s) next to the motor. In this way the height of the bearing and motor can be relatively low as the connection of the bearing(s) is (are) not below but to the side of the motor.

As the bearing is normally made from an elastomer it can generally be injection molded to the motor or motor housing and/or the base supporting the motor. Generally, the invention uses, however, a bearing that can be detachably arranged on the motor and/or the base. For this purpose, the bearing is generally a hollow cylinder with the said connecting head and an opposed connecting base. In most cases, a shape conically tapering from the connecting base to the connecting head is chosen.

The connecting base and the connecting head of the bearing are generally detachably accommodated in a respective opening in a fixing on the motor or on the base. Due to the hollow cylindrical shape of the bearing it can at the same time also accommodate one or several cables, a Bowden cable, etc., running for instance, from the base or motor to the outside.

The base can be an inner door panel, a motor housing, a mounting plate, a unit carrier, a door module carrier, etc. although the invention is not limited to these. It has also been proven to be advantageous if the motor is accommodated in a recess in the base. This offers the option of sealing the recess thus fully encapsulating the motor. In this case the closure of the recess generally serves as the base. This means that in this case the closure generally accommodates the connecting base of the bearing, whilst the connecting head of the bearing is connected to the motor or an arm or similar of the motor housing.

Normally, the motor or the motor housing, made in most cases of plastic, contains one or more attached arms. The arm normally detachably accommodates the connecting head of the bearing. Generally, the bearing can also be injection molded to the respective arm or produced in one operation as a 2K version. In another embodiment, also a panel formed laterally on the motor housing for accommodating the connecting base is feasible, in which the connecting head is then connected to, for instance, the door module carrier by, for instance, a clip connection.

Generally the bearing is designed as a bellows due to its normal concertina section and hollow cylindrical design. This means that easily produced bellows, with some modifications where necessary, can be used. To further enhance the sound-insulating effect it has proven to be advantageous if the base also contains a sound-absorbing cladding. In most cases, the internal surface of the base facing the motor is clad with sound-absorbing material or a respective sound-absorbing internal cladding is used. Foam or comparable porous material has proven to be advantageous, as they reliably attenuate any remaining airborne sound. In contrast, the bearing of the invention mainly attenuates structure-borne noise and interrupts the transmission of structure-borne noise, thus achieving overall special acoustic advantages as both structure-borne and air-borne noise is effectively attenuated.

The result is a drive component for a motor vehicle unit, preferably for a closing/opening device in or on a motor vehicle door lock. The drive component is generally arranged inside a motor vehicle door and is in most cases physically separated from the closing/opening device or levers generally used therein. The external drive component and the motor vehicle door lock are generally connected to the integrated closing/opening device or the said levers via a Bowden cable or another flexible connection means. This transfers the movements of the motor to the said levers inside or on the motor vehicle door lock.

An actuation of the motor to, for instance, carry out the closing function, now causes the motor to become an unwanted noise source, mainly transmitting structure-borne noise to the motor vehicle door and the entire car body through any vibrations. In embodiments of the invention, this structure-borne noise is attenuated by the special rubber-elastic bearing used for fixing the motor to the base. The first spring rate of the bearing is mainly responsible for this. The second and comparably larger spring rate mostly comes into play when the bearing operates as an end stop for the motor, for instance in the event of a crash, in case of considerable acceleration, during braking, in bends or on uneven road surfaces. This is particularly desirable for safety reasons.

As the bearing provides a flexible and membrane-like suspension for the motor which is basically only spatially fixed by the bearings, no vibrations are transmitted onto the base. No forces do therefore act on the drive component, in particular, as the Bowden cable connected to the motor in the example, contains its own thrust bearing. The motor can thus swing or vibrate freely with the vibrations being effectively absorbed—as described—by the rubber-elastic bearing.

At the same time, the bearing can function as a membrane, separating the motor generally located in a so-called dry area from a wet area. The wet area can contain a door module and also the motor vehicle door lock. This wet area is generally the outwardly facing cavity inside the motor vehicle door which is separated by the internal door panel or a module carrier and a foil from the so-called dry area inside the motor vehicle door. This dry area generally houses safety components, such as a side airbag or also electrical components such as speakers.

The motor bearing of the invention ensures not only an optimized attenuation of the motor noise but also provides due to its membrane-like character, a sealing connection between the dry room and the wet room. Only the Bowden cable acted upon by the motor runs through an obligatory opening at this point, said cable ending in the motor vehicle door lock arranged in the wet area. Naturally also other installation options are feasible and are covered by the invention.

BRIEF DESCRIPTION OF THE DRAWINGS

Below, the invention is explained in detail with reference to exemplary drawings showing only one embodiment, as follows.

Figure 1:
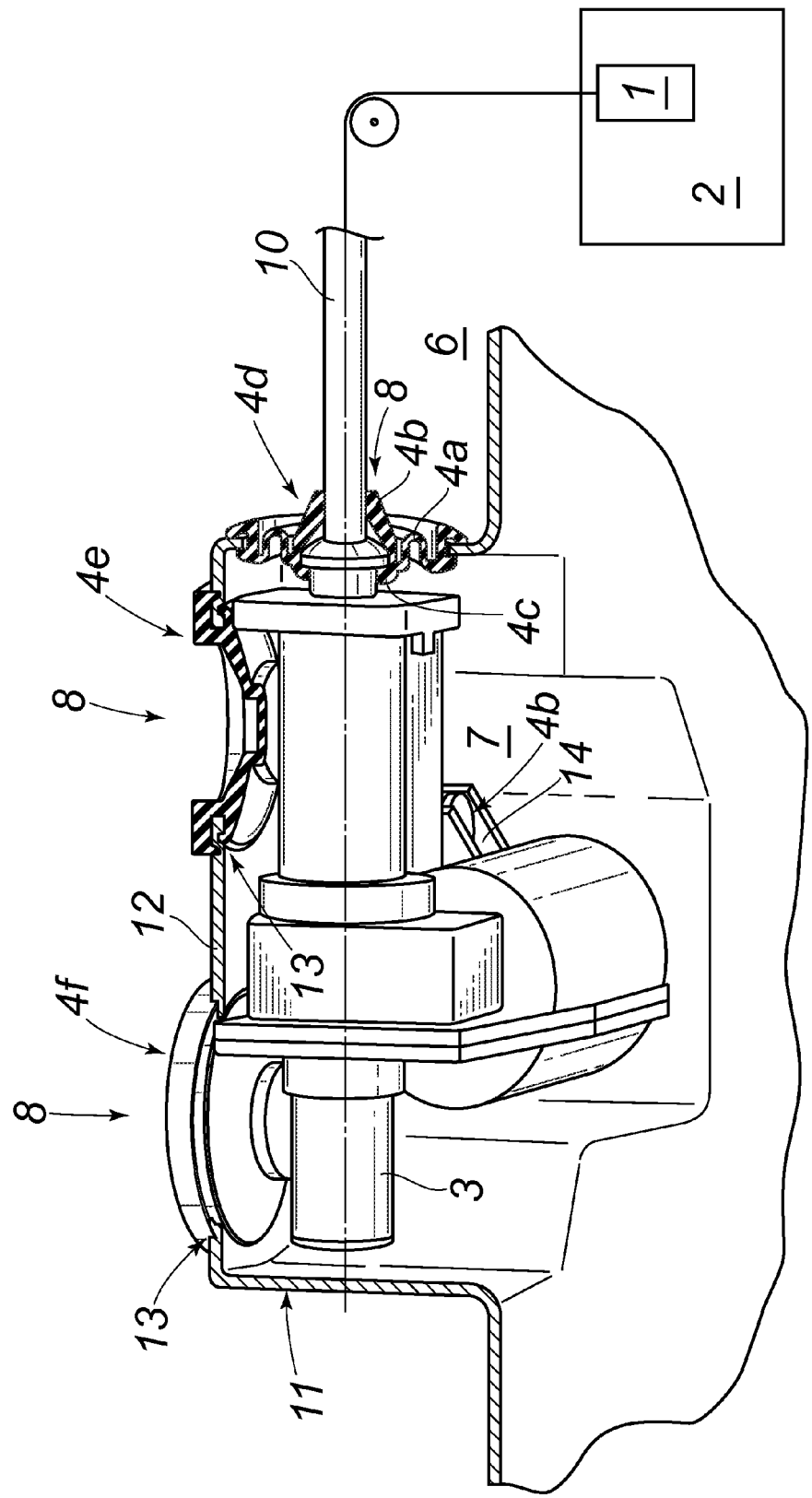
FIG. 1 shows a configuration of a drive component of the invention for a motor vehicle unit.

Other features and advantages of the present invention will become apparent from the following detailed description, taken in conjunction with the accompanying drawings which illustrate, by way of example, the principles of the invention.

DETAILED DESCRIPTION OF THE INVENTION

The figures show a drive component for a motor vehicle unit, predominantly for a closing/opening device 1. The closing/opening device 1 is arranged inside a motor vehicle door lock 2, which is only indicated. As usual, the closing/opening device 1 acts on the rotary latch inside the motor vehicle door lock 2 with the aid of a closing handle or another lever so that the rotary latch is moved from its intermediate closed position or intermediate locked position to a fully closed position or fully locked position. Such an arrangement is already known and not the object of the present invention.

The described drive component actually mainly consists of one motor 3 and elastic or rubber-elastic bearings 4*d*-4*g* for fixing the motor 3 to a base 5. In the embodiment, the base 5 is a so-called internal door panel 5, which in the drawing separates a wet room 6 from a dry room 7 inside a motor vehicle door and which is not shown in detail. The wet room 6 refers to the area inside the motor vehicle door, into which generally moisture can penetrate, for instance, through the window-lifting mechanism arranged therein and which also leaves the motor vehicle door via holes contained therein. Generally and in the example, the motor vehicle door lock 2 is located in the said wet area 6.

This area must be differentiated from the dry area 7, referring to the area on the inside of the motor vehicle door, usually separated by means of a foil or in another manner from the wet area 6 and which—as already apparent from the name—contains no moisture. The dry area 7 thus houses components susceptible to moisture, such as speakers, side airbag, etc. In addition, the motor 3 is located in the dry area 7, i.e. in the area of a through-opening 8 to the wet area 6.

Figure 2:
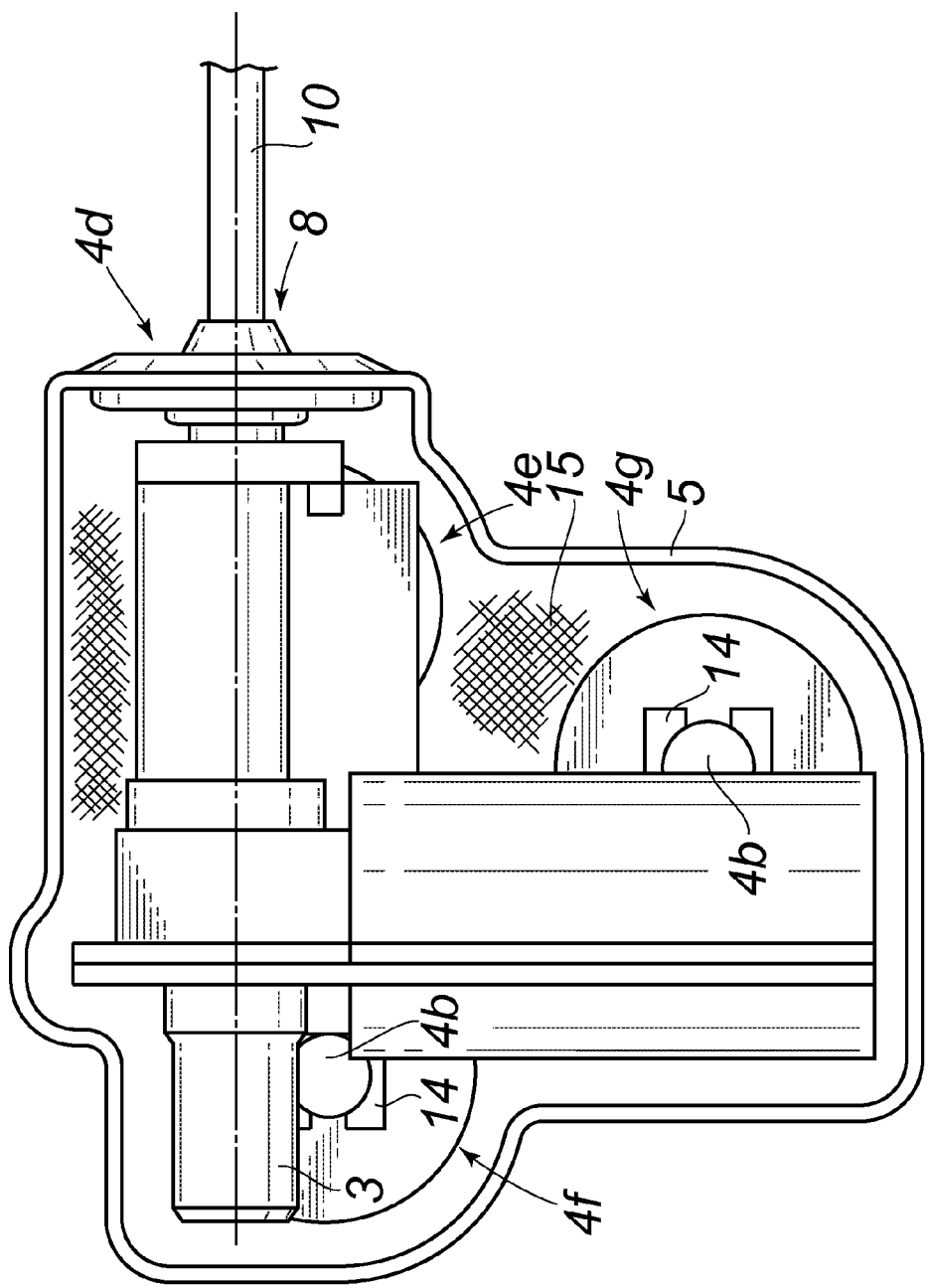
FIG. 2 shows another view of the invention.

In the example shown in FIGS. 1 and 2, four rubber-elastic bearings 4*d*-4*g* are provided for fixing the motor 3 to the base 5.

All bearings 4*d* have in common that they contain different spring rates $D_1$ and $D_2$ in axial direction A and/or radial direction R and depending on the level of deformation. For this purpose, the respective bearing 4*d* in the axial section and/or the radial section is at least partly designed as a concertina, containing a concertina section 4*a*. The concertina section 4*a* has a first spring rate $D_1$, corresponding to or resulting from the elastic and structural deformation of the said concertina section 4*a*. In addition, the bearing 4*d* also has a second greater spring rate $D_2$, corresponding to the rubber-elastic intramolecular deformation of the bearing material, i.e. the material from which the bearing 4*d* is made.

The second spring rate $D_2$ ($D_2>D_1$), which is greater than the first spring rate $D_1$ comes into play when the concertina section 4*a* is fully compressed and when any additional forces acting on the bearing 4*d* no longer correspond to an elastic structural deformation, i.e. an elongation or compression but are instead absorbed as such intramolecularly by the rubber-elastic bearing material. This has already been explained in detail in the description.

It is apparent that the four bearings 4*d*-4*g* in FIG. 1 span two bearing planes. First of all, three bearings 4*e*-4*g* are located underneath or to the side of the motor or electric motor 3, defining a common bearing plane. A fourth bearing 4*d* is furthermore arranged perpendicular to this bearing plane, sealing the through-opening 8 between the dry area 7 and the wet area 6.

The motor 3 is in any case provided with an overall force-free connection and fixing to base 5, as a Bowden cable 10 in the example or a comparable elastic connection means originating at the motor 3 has its own thrust bearing. The motor 3 can thus vibrate freely in its space or the several bearings 4*d*-4*g* are able to effectively attenuate any vibrations of the motor 3. Indeed no actual structure-borne noise is transmitted from the motor 3 to the base 5.

As the motor 3 is fully located in the dry area 7, as the bearing 4*d*-4*g* provided at the drive of the motor 3 also acts as a sealing collar, any functional defects of the motor 3, designed as a high-speed DC motor, are virtually ruled out. The bearing 4*d*-4*g* is overall also designed as a hollow cylinder and is generally made of a rubber-elastic plastic or a polymer, as already specified in the description. Because of its hollow cylindrical design, the bearing 4*d* can act at the same time as an opening and a sealing collar for a cable or the Bowden cable 10 in the examples. This provides the mechanical connection of the motor 3 from the dry area 7 via the Bowden cable 10 through the respective bearing 4*d* to the closing/opening device 1 inside the motor vehicle door lock 2.

As already described, the base 5 can be designed as an internal door panel. It is, however, also possible to define the base 5 on or in a closure 12, as indicated in FIG. 1. This closure 12 can serve to seal off the recess 11 of the base 5. The recess 11 and the closure 12 serve to house the entire motor 3 and are defined in FIG. 1 inside the internal door panel.

Such a design is recommended for safety reasons, in particular, in the event of a side impact, when considerable lateral acceleration forces act on the said motor 3. Such forces are, on one hand, absorbed by the housing accommodating the motor 3 and, on the other hand, by the bearing 4*d* or the several bearings 4*d*-4*g*. As in these cases, the respective concertina section 4*a* is completely compressed, moving the bearing 4*d* "to block", so that the greater spring rate $D_2$ becomes primarily relevant. The large spring rate $D_2$ counteracts indeed any deformations with considerable counterforces when the bearing 4d also acts as an end stop during such driving dynamics situations.

As a whole, the bearing 4d-4g can be detachably coupled to the motor 3. For this purpose, the bearing 4d-4g may contain slots 13 cooperating with engaging bars of the base 5 or of the closure 12 for fixing the bearing 4d-4g in the respective through-opening 8. In the illustrated example, the slots 13 are radial grooves in the base area of the bearing 4d-4g. Naturally or as an alternative it is possible for the bearing 4d-4g to be injection molded to the motor 3 and/or the base 5 and/or the closure 12, as usually, the motor 3 has a plastic housing or all or parts of the base 5 are made from plastic or metal. Elastomers that are available as materials for the bearing 4d-4g can generally in any case be easily connected to such materials (plastic, steel) by injection molding.

It is particularly advantageous, however, if the bearing 4d is detachably coupled to the base 5 or the closure 12 as shown for both embodiments in FIGS. 1 and 2. The bearing 4d has a connecting head 4b and a connecting base 4c. From the sectional view shown in FIG. 1 it is apparent that the bearing 4d tapers conically from the connecting base 4c to the connecting head 4b. This ensures that the bearing 4d during maximum lateral accelerations in case of a crash and during its compression is not only pushed together in concertina fashion but that in this case the individual areas of the concertina section 4a are concentrically moved together, so that the respective bearing point of the motor 3 remains unchanged.

It is apparent that the bearings 4e-4g are partly accommodated by an arm 14 and in fact regularly with their connecting head 4b. The arm 14 can be connected to the motor as a single piece or to a respective motor housing and contains an opening adapted to the connecting head 4b. It is also apparent that the respective bearing (of the three bearings 4e-4g to the side or underneath the motor 3) is arranged with its connecting head 4b in vertical projection or when viewing the base 5 from the top, to the side of the motor 3. This results in a particular space-saving and compact fixing of the motor 3.

The bearing 4d is, in any case, designed as a bellows with the aforementioned folds, which due to their conical nature slide concentrically into each other when the bearing 4d is compressed. The reverse applies when the bearing 4d is stretched. The bearing 4d-4g primarily serves to attenuate any structure-borne noise produced by the motor 3. Any additionally generated airborne noise can only be attenuated with the aid of a sound-absorbing internal cladding 15. This sound-absorbing internal cladding 15 can be attached to the base 5 as a foam layer or another porous coating and on the inner surface facing the motor 3. This is in principle indicated in FIG. 2.

It is to be understood that the above-described embodiment is illustrative of only one of the many possible specific embodiments which can represent applications of the principles of the invention. Numerous and varied other arrangements can be readily devised by those skilled in the art without departing from the spirit and scope of the invention.

What is claimed is:

1. A drive component for a motor vehicle door unit, that is, a closing/opening device (1) in or on a motor vehicle door lock (2), comprising:
    at least one motor (3) and at least a first rubber-elastic bearing (4d) and at least a second rubber-elastic bearing (4e-4g), arranged perpendicularly to each other, for fixing the motor (3) on a base (5), wherein the motor (3) is fixed and suspended on the base (5) only by the first and second bearings (4d-4g) for preventing transmission of vibrations to the base (5), and the first and second bearings (4d-4g) have different spring rates ($D_1$, $D_2$) in the axial direction (A) and/or the radial direction (R),
    wherein the first bearing (4d) in its axial and/or radial section is at least partially designed in a corrugated, concertina bellows shape with a first spring rate ($D_1$) corresponding to the elastic structural deformation of a concertina part (4a) for attenuating structure-borne noise from the motor (3),
    and wherein the first bearing (4d) also has a second spring rate ($D_2$) corresponding to the rubber-elastic intramolecular deformation of the bearing material, said second spring rate ($D_2$) being greater than the first spring rate ($D_1$) of the first bearing, wherein the second spring rate ($D_2$) is the spring rate of the second bearings (4e-4g),
    such that after full compression of the concertina part (4a) when the first bearing (4d) operates as an end stop for the motor (3), the first and second bearings still absorb forces.

2. The drive component according to claim 1, wherein at least one first bearing (4d) and at least three second bearings (4e-4g) are provided wherein the second bearings span a common bearing plane.

3. The drive component according to claim 1, wherein a generally flat, planar surface of the base (5) extends in a horizontal direction, and the first bearing (4d) is arranged to project horizontally while the second bearings (4e-4g) project vertically on the base (5), with connecting heads (4b) of the first and second bearings (4d-4g) arranged next to the motor (3).

4. The drive component according to claim 1, wherein the first and second bearings have hollow, generally conically-tapered, cylinder shapes.

5. The drive component according to claim 1, wherein the first and second bearings (4d-4g) are generally conically shaped.

6. The drive component according to claim 1, wherein the first and second bearings are made from an elastomer, such as PP or NR.

7. The drive component according to claim 1, wherein the first bearing (4d) also serves as a duct for a cable or a Bowden cable (10) leading from the motor (3) to the outside.

8. The drive component according to claim 1, wherein the base (5) is selected from the group consisting of an internal door panel, motor housing, assembly panel, unit carrier, and module carrier.

9. The drive component according to claim 1, wherein the motor (3) is accommodated in a recess (11) in the base (5).

10. The drive component according to claim 9, wherein a closure (12) of the recess (11) functions as the base (5).

11. The drive component according to claim 1, wherein the first and second bearings (4d-4g) are accommodated in respective through-openings (8), of the base (5) or are injection molded to said respective through-openings (8).

12. The drive component according to claim 1, wherein the second bearing (4e-4g) is fixed in an arm (14) on the motor (3) or is injection molded to said arm 14.

13. The drive component according to claim 1, wherein the first and second bearings (4d-4g) are designed as bellows.

14. The drive component according to claim 1, wherein the base (5) contains a sound-absorbing internal cladding (15) facing the motor (3).

15. A method for reducing noise produced by a drive component for a motor vehicle door unit that is a closing/opening device in or on a motor vehicle door lock, comprising:
    forming at least a first rubber-elastic bearing and at least a second rubber-elastic bearing, arranged perpendicularly to each other, for fixing a motor on a base, wherein the first and second bearings have different spring rates ($D_1$, $D_2$) in the axial direction and/or the radial direction, and wherein the first bearing in its axial and/or radial section is at least partially designed in a corrugated, concertina bellows shape with a first spring rate ($D_1$) corresponding to the elastic structural deformation of a concertina part, and wherein the first bearing also has a second spring rate ($D_2$) corresponding to the rubber-elastic intramolecular deformation of the bearing material, said second spring rate ($D_2$) being greater than the first spring rate ($D_1$) of the first bearing;

preventing transmission of vibrations to the base by fixing and suspending the motor on the base only by the first and second bearings;

attenuating structure-borne noise from the motor via use of the first spring rate ($D_1$) of the first bearing, wherein the second spring rate ($D_2$) is the spring rate of the second bearings; and when the first bearing operates as an end stop for the motor after its concertina part fully compresses, forces acting on the motor are still absorbed via use of the second spring rate ($D_2$) of the first and second bearings.

\* \* \* \* \*